July 9, 1957
R. H. DICKE
2,798,994
FOLLOW-UP SYSTEM
Filed Aug. 12, 1954
3 Sheets-Sheet 1
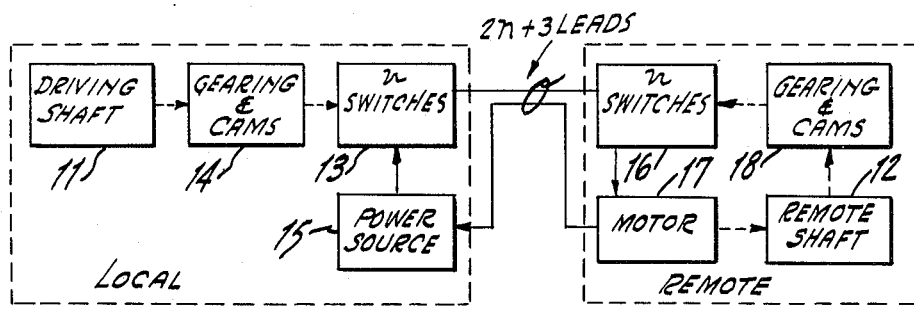
Fig. 1.
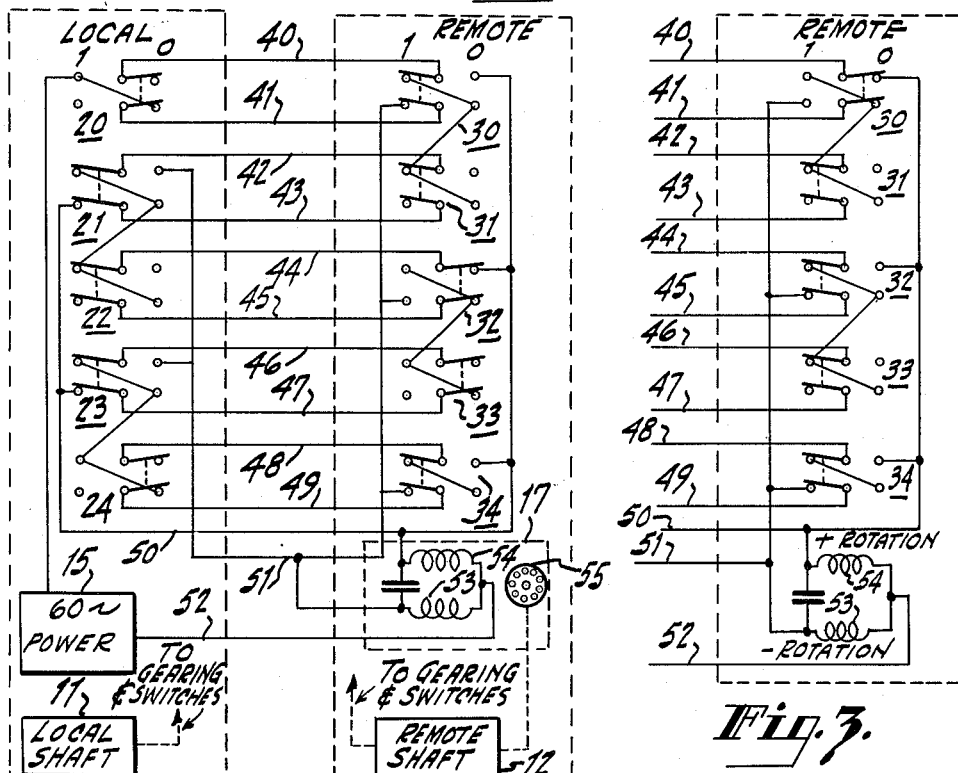
Fig. 2.
Fig. 3.
INVENTOR.
ROBERT H. DICKE
BY
J. C. Whittaker
ATTORNEY July 9, 1957 R. H. DICKE 2,798,994
FOLLOW-UP SYSTEM
Filed Aug. 12, 1954 3 Sheets-Sheet 2
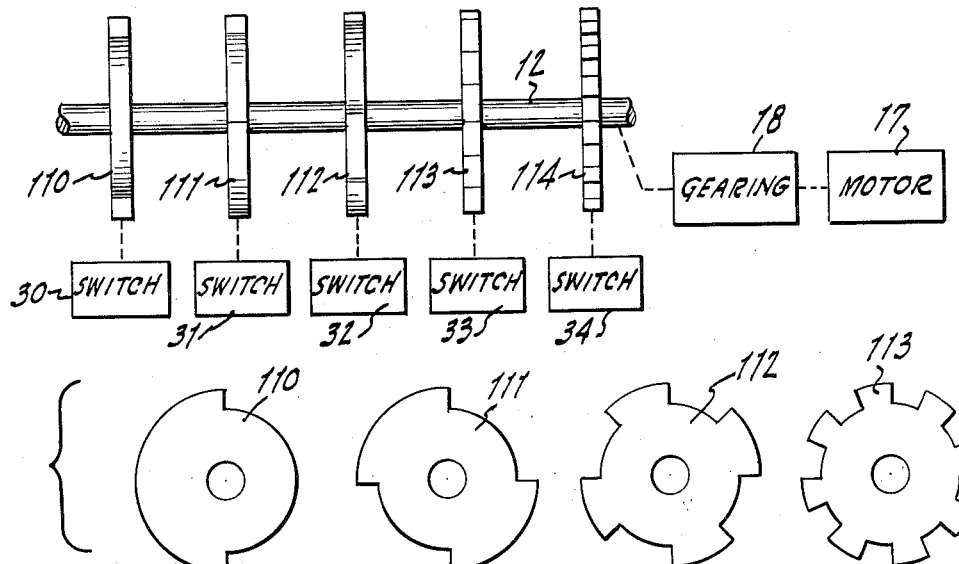
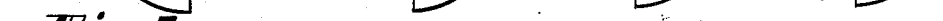
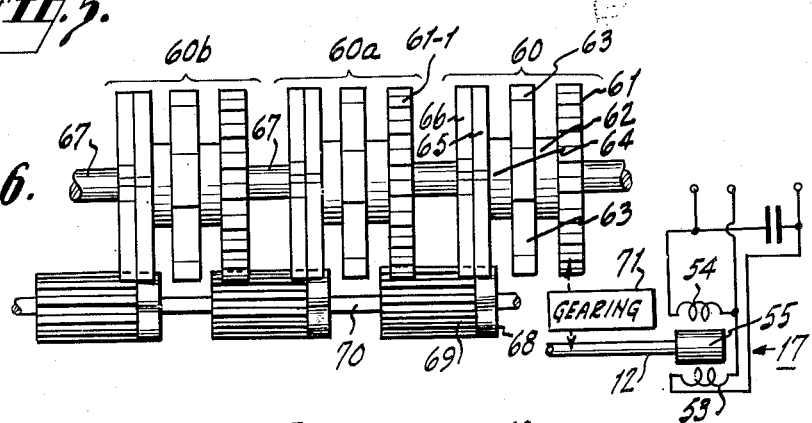
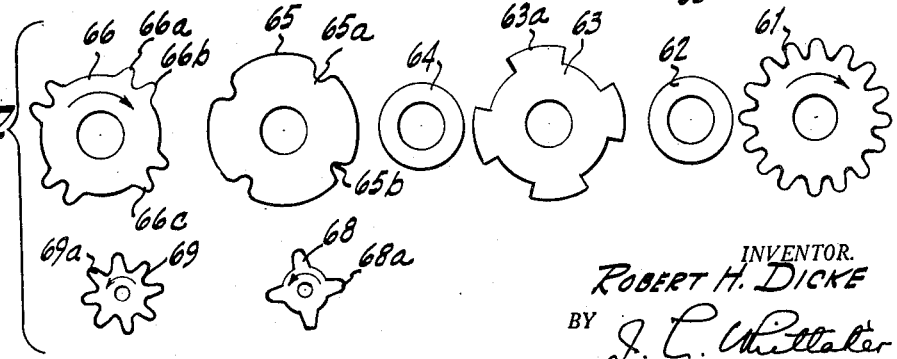
INVENTOR.
ROBERT H. DICKE
BY
ATTORNEY

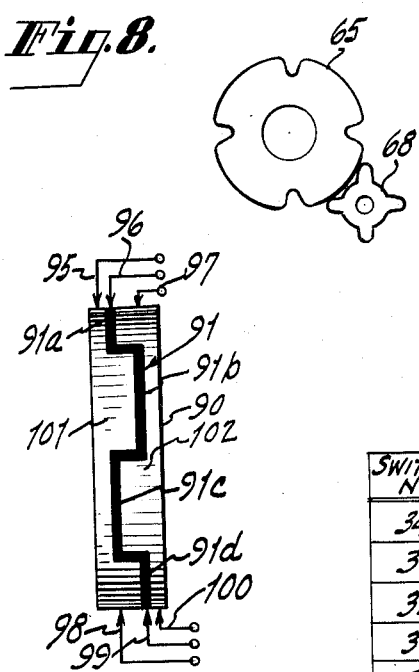
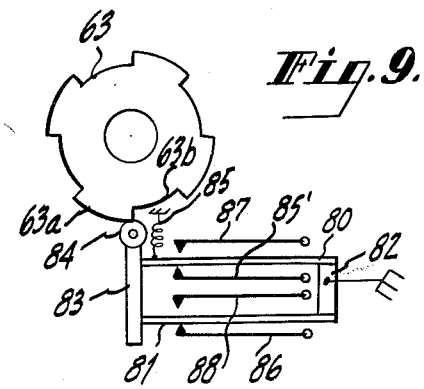
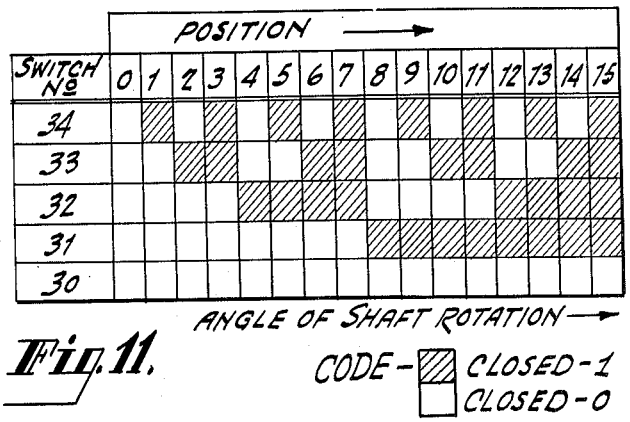
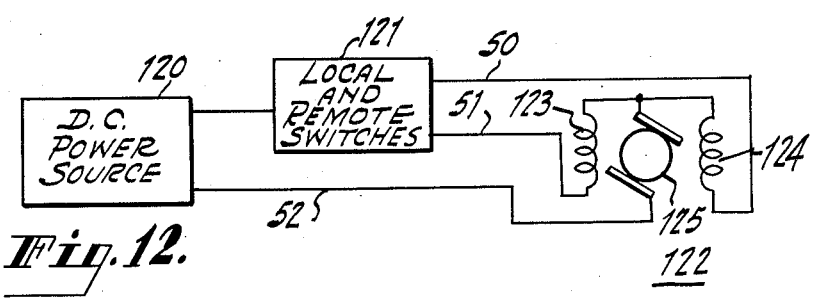

United States Patent Office 2,798,994
Patented July 9, 1957

2,798,994

FOLLOW-UP SYSTEM

Robert H. Dicke, Princeton, N. J.

Application August 12, 1954, Serial No. 449,408

14 Claims. (Cl. 318—33)

The present invention relates to an improved system for remotely controlling the position of an object.

Position control systems are known which translate the position of an object such as a shaft into coded information and which utilize the coded information indirectly to move a second shaft into positional alignment therewith. Typically such systems employ a binary number code. However, these systems require relatively complex circuit components such as tubes, multivibrators, servomotors, tachometers, relays and the like. Such systems do not compare the transmitted coded information on the binary level, but instead, after transmitting the coded information, must first convert the same into another form of energy having a parameter representative of the position of the driving shaft. The code, for example, may be converted to a direct current the relative or absolute amplitude of which is indicative of the angle of rotation of the driving shaft and the sense of which is indicative of the direction of rotation, or the coded information may be translated into an amplitude, phase or frequency modulated signal the amplitude of the modulation being indicative of the angle of rotation of the driving shaft. In other systems complex adder and subtractor circuits are required as well as pulse and gate circuits, and conversion systems for transforming one form of digital information into other forms of digital information prior to converting the information into a usable output. Thus the known advantages of using coded information are seriously impaired by the relatively complex circuitry which has been required heretofore and by the greater possibility of error which may be introduced by these circuits.

It is an object of the present invention to provide an improved, remote control system and utilizing binary coded information wherein there is digital comparison on the binary level.

It is a further object of the present invention to provide an improved system of the above type wherein only simple trouble-free components such as switches, cams and a simple drive mechanism need be employed.

It is yet another object of the present invention to provide an improved, very precise system for positioning a driven object in accordance with the position of a driving object.

A typical embodiment of the present invention includes translating means for providing a binary or other plural digit number indicative of the position of a driving object and other translating means for providing a binary or other plural digit number indicative of the position of a driven object. When the driving and driven objects are in the same relative positions the binary numbers are equal. The two binary numbers are compared on the binary level digit by digit and when the numbers are unequal an output is obtained having a given sense depending upon the direction of departure of the driven object from the driving object. This output is utilized to move the driven object in the proper direction to reduce to zero the difference between the two binary numbers and thereby to reduce to zero the positional error of the two objects.

In a preferred form of the invention each translating means includes a set of switches. The position of each switch of each set represents either the digit 0 or 1 of the binary code and each set of switches represents a binary number. The switches are connected between a source of power and a reversible motor or other drive mechanism in such manner that when one set represents a binary number different from the other set, power is applied through certain of the switches to the motor in a sense dependent upon whether the second set represents a binary number greater or less than the first set. The motor is coupled to the driven object and moves the same in the proper direction to reduce to zero the difference between the binary numbers. When the objects are in positional alignment the switches disconnect the source of power from the motor.

The invention will be described in greater detail by reference to the following description taken in connection with the accompanying drawing in which:

Fig. 1 is a block diagram of a typical embodiment of the present invention;

Fig. 2 is a schematic circuit diagram showing in greater detail portions of Fig. 1;

Fig. 3 is a schematic circuit diagram of the remote switches of the invention in a different position than the remote switches illustrated in Fig. 2;

Fig. 4 is a side view of one typical cam arrangement according to the present invention;

Fig. 5 is an exploded plan view of some of the cams shown in Fig. 4;

Fig. 6 is a side view of another typical gearing and cam arrangement according to the present invention;

Fig. 7 is an exploded plan view of a portion of the gearing and cams shown in Fig. 6;

Fig. 8 is a plan view of two of the elements illustrated in Fig. 7 showing the relative positions of said elements during one part of the operational cycle of the invention;

Fig. 9 is a more detailed plan view of one embodiment of a typical switch and cam of the present invention;

Fig. 10 is a side view of a second embodiment of a switch which may be used in the present invention;

Fig. 11 is a chart showing the position of each switch in a bank of switches relative to the angle of rotation of a driving or driven shaft; and Fig. 12 is a circuit diagram of a modified drive mechanism of the present invention.

In the drawing, similar reference numerals refer to similar elements.

Referring now to Fig. 1, it is desired to move remote shaft 12 into positional alignment with driving shaft 11. The driving shaft may be any movable object such as, for example, an antenna and the remote shaft any other object it is desired to move into positional alignment therewith such as, for example, a searchlight, gun or second antenna. The driving shaft actuates a bank of local switches 13 through gearing and cams 14. A source of power 15 is shown in the drawing as located at the local position, however, it is to be understood that the source may be located either locally or remotely. This source may be ordinary 60-cycle power, D.-C. power or other types of electrical power. According to the position of the switches in bank 13, power will be transmitted from said source through said switches to a remote bank of switches 16. There are the same number of switches in bank 16 as in bank 13. If there are $n$ switches in each bank, only $2n+3$ leads are required from the local to the remote station. These matters will be explained in further detail below.

If switches 16 are in the same relative positions as switches 13, power from source 15 will be prevented from being supplied to motor 17 and motor 17 will thereby be prevented from moving remote shaft 12. If, on the other hand, the positions of the switches in bank 16 do not correspond with the positions of those in bank 13, power will be supplied in the proper sense to the motor to move remote shaft 12 into positional correspondence with driving shaft 11 and also to change the positions of switches 16 through gearing 18 so that the latter switches are in correspondence with the local switches. At the latter time, remote shaft 12 is in positional alignment with driving shaft 11 and switches 16 effectively open the circuit between the power source and motor and prevent the latter from rotating the remote shaft further. Any further movement of the driving shaft again destroys the correspondence between local and remote switches and causes the power source to energize motor 17 which in turn again moves shaft 12 until it is in positional alignment with the driving shaft.

For purposes of further explanation it will be assumed that each switch bank comprises five double-pole, double-throw switches. It is to be understood, however, that the invention is not limited to five switches or to double-pole, double-throw switches.

Fig. 2 illustrates a typical switch arrangement according to the present invention. It includes a local bank of double-pole, double-throw switches 20-24 and a remote bank of double-pole, double-throw switches 30-34. So that the shaft positions may be translated into binary numbers it will be assumed that the left contacts of each switch represent the digit 1 and the right contacts the digit 0. Corresponding arms of the switches are connected together by leads 40-49. Several of the left contacts of the local bank of switches are connected to several of the right contacts of the remote bank of switches by lead 50 and similarly several of the right contacts of the local switches are connected to left contacts of the remote switches by lead 51. The last lead 52 is from power source 15 to the center point of the field winding 53, 54 of motor 17. It will be seen from Fig. 2 that there are $2n+3$ or 13 leads from the local to the remote position, $n$ being the number of switches in each bank. It can be shown that the expression $2n+3$ holds for any number of switches.

Translating the switch positions shown in Fig. 2 into binary numbers, reading from top to bottom, the local switches represent the binary number 01110 or $$1 \times 2^3 + 1 \times 2^2 + 1 \times 2^1 + 0 \times 2^0 = 14$$

This is also shown in the table of Fig. 11. The remote switches, on the other hand, represent the binary number 11001 or $1 \times 2^4 + 1 \times 2^3 + 0 \times 2^2 + 0 \times 2^1 + 1 = 25$. The output shaft is at a higher position than the local shaft and power therefore must be supplied to the field winding of the motor to rotate the latter in the minus, or run-down direction. Tracing the circuit, current is supplied through switch 20, over lead 41, and through switch 30 to the field winding of the motor causing the latter to rotate remote shaft 12 in a direction to reduce the difference between the remote and local binary numbers.

Fig. 3 illustrates the same remote switches shown in Fig. 2 after an interval of time during which they have been moved to represent binary number 01111 or 15, which is just one more than the binary number represented by the local switches. Tracing the circuit again, it is seen that power is now supplied through switch 20, lead 41, switch 30, switch 31, lead 42, switch 21, switch 22, lead 44, switch 32, switch 33, lead 46, switch 23, switch 24, lead 49, and switch 34 to the field winding of motor 17. Thus, the motor is continuing to rotate in the run-down direction moving the remote shaft closer to the position of the local shaft and moving the remote binary number into closer correspondence with the local binary number. The next double-pole, double-throw switch to be moved is switch 34 which will be moved into the zero position. If the circuit is now traced, it will be seen that the connection between the 60-cycle power source 15 and the field winding of motor 17 is broken. The remote shaft is now in positional alignment with the local shaft.

It may be seen from an examination of the interconnection of the switches in Fig. 2 that the motor is caused to operate or not and in the proper direction through the following operational procedure: The first digit of the two binary numbers (the one represented by switches 20 and 30) are compared first to see whether they are alike or unalike. If the digits are unalike, current passes through these two switches and no other switches to motor 17 which is energized for the proper direction of rotation. If the two digits are alike, that is, both switches in the "1" position or both switches in the "0" position, current passes through the first pair of switches 20, 30 to the next pair of switches 21 and 31. The second pair of switches 21 and 31 make a similar comparison of the second digit. In this case switches 20 and 30 serve only as a current path to switches 21 and 31. The latter either permit current to pass to the motor or serve as current paths for the third pair of switches 22, 32, depending upon whether or not the second set of switches 21, 31 are in the same relative positions. This procedure is repeated until the motor moves corresponding switches into the same positions and local and remote shafts are in alignment.

The switch arrangement illustrated in Fig. 2 represents a true digital comparison system wherein each digit of a binary code is compared with a like digit of a second binary code. The largest digits are compared first and the smaller digits next, in order of magnitude.

In a preferred embodiment of the present invention it is desirable that the double-pole, double-throw switches be of the make-before-break type in order that the motor continue smoothly to rotate as the switches are moved from one position to another position. In such case, in between switch positions the same potential is applied to coils 53 and 54 and the motor continues to rotate in the same direction.

Figs. 4 and 5 illustrate details of a simple cam arrangement for actuating the various switches. It is to be understood that the same cam arrangement may be used at both local and remote positions, the remote cam arrangement being illustrated in Fig. 4. The arrangement comprises five cams 110-114 all securely mounted to the remote shaft 12, or, if desired, to a shaft driven by the remote shaft. The first cam 110 has a 180° cut-out portion; second cam 111 has 90° cut-out portions; third cam 112 has 45° cut-out portions; cam 113 has 22½° cut-out portions; and cam 114 has 11¼° cut-out portions. Each cam actuates a separate double-pole, double-throw switch, cam 110 actuating the switch representative of the binary digit of greatest magnitude and cam 114 actuating switch 34 representative of the binary digit of least magnitude. The double-pole, double-throw switches may be of the type illustrated in Fig. 9 and explained in the discussion of this figure. With the described arrangement, the double-pole, double-throw switches are successively closed for varying degrees of shaft rotation as indicated in Fig. 11.

The above cam arrangement is quite adequate for a five unit binary number system, however, if greater accuracy were required which would require more than five or six switches it would be preferable to use the gearing and cam switch actuating mechanism shown in Figs. 6, 7, 8 and 9. This mechanism is an odometer type structure including a plurality of odometer components 60, 60a, 60b etc. One component is required to actuate each switch, however, since each of these components are identical only three have been illustrated in Fig. 6. The odometer components are freely mounted on a shaft 67. The first component, which actuates the switch controlling the lowest magnitude digit, is driven by one of the shafts, Fig. 6 illustrating remote shaft 12. When the local and remote switches do not correspond, that is, when the local and remote binary numbers are unequal, energy is supplied either to field winding 53 or 54 of motor 17 causing the armature 55 thereof to rotate in the proper sense to match the positions of the remote and local shafts and thereby to reduce to zero the difference in the local and remote binary numbers. In a preferred embodiment of the invention, gearing 71 is interposed between the shaft and gear 61 of the driven odometer component to rotate element 61 at a much faster rate than the rotation of input shaft 12. Thus, in the present example, there are five switches which permit indication of 32 discrete shaft positions. If it is desired to represent 360° of rotation, each binary number represents 360/32 or 11¼° of shaft rotation. But the odometer component 68a must turn 45° to move its switch, and therefore the binary number formed thereby, to a new value. Accordingly, gearing 71 should provide a 4–1 step-up ratio, that is, one complete revolution of shaft 12 should cause four complete revolutions of element 61. If it is desired to represent less than 360° of rotation, the gear ratio may be more than 4:1 in which case each binary number will represent less than 11¼°.

Each odometer component consists of six parts 61–66 rigidly fastened together and freely rotatable upon shaft 67. Fig. 7 shows these parts in exploded view. The first part is gear 61 which has 16 teeth, each occupying an angle of 22½°. The following element is a spacer 62. Next in order is cam 63, the segments 63a of which occupy 45°. This cam actuates a double-pole, double-throw swith as illustrated in Fig. 9 and as will be explained in more detail below. Adjacent to cam 63 is a second spacer 64 and adjacent to the spacer notched cam 65, the notches 65a of which each encompasses an angle of 22½°. The final element is buck-toothed partial gear 66, the teeth 66a and 66b of which together encompass an angle of 45°. Notched cam 65 is engageable with pinion 68 and buck-toothed partial gear 66 is engageable with pinion 69. The latter pinion also engages the next adjacent full gear 61–1 as illustrated in Fig. 6. Pinions 68 and 69 are rigidly secured together and are freely rotatable on shaft 70 (Fig. 6).

In operation, rotation of shaft 12 is stepped up by gearing 71 and rotates full gear 61. Each 45° of rotation of odometer component 60, cam 63 moves the first double-pole, double-throw switch 34 from one position to its second position as shown in Fig. 11.

The normally stationary position of an odometer component is such that notched cam 65 is positioned with respect to pinion 68 as shown in Fig. 8. In this position pinion 68 is locked and this locks pinion 69 which in turn locks the following gear 61–1. Referring again to Figs. 6 and 7, as gear element 61 is rotated in the direction indicated, a tooth 66c of buck-toothed partial gear 66 is caused to engage a tooth 69a of pinion 69 and the latter is rotated in the direction indicated. This causes a tooth 68a of pinion 68 to engage notch 65b of notched cam 65. The result is a two toothed (45°) rotation of gear 61–1 of the next odometer component. During the next 45° of rotation of gear 61 notched cam 65 and pinion 68 will be in the position shown, effectively locking the odometer component next adjacent it to the left.

It can readily be seen that with the gearing and cam action described, the five switches of each bank will assume the positions shown in the table of Fig. 11. Thus, for example, in one shaft position all switches are in the "0" position; 45° of rotation of gear 61 causes the switch representative of the binary digit of lowest magnitude to move to the "1" position; the next 45° of rotation causes the switch representative of the binary number of lowest magnitude to move back to the "0" position and the switch representative of the binary number of the next higher magnitude to move to the "1" position and so forth. For every four revolutions made by odometer component 60, odometer component 60a makes two revolutions and similarly odometer component 60b makes one revolution, etc. Adjacent components rotate intermittently, however, all components when rotating do so at the same speed and make and break contact together.

The described system provides a trouble-free and extremely accurate follow-up system. In the illustrated embodiment five switches are employed in each bank, requiring a total of thirteen wires between local and remote locations and providing information as to 32 discrete shaft positions. If the number of switches is increased to ten, for example, only 23 wires would be needed and 1024 different shaft positions could be indicated; and with 13 switches, requiring 29 wires, 8192 shaft positions could be indicated.

Fig. 9 illustrates details of one form of double switch which may be employed in the present invention. It comprises a pair of switch arms 80, 81 secured together at one end thereof by an insulator bar 82 which is mounted on a support. At the other end the switch arms are mounted in a movable insulator element 83 to which a roller 84 is mounted. The arms are normally biased by means of spring 85 toward cam 63. When cam surface 63a engages roller 84, arms 80 and 81 make contact with contacts 85' and 86 respectively; when cam 63 rotates so that roller 84 is engaged with notch 63b, switch arms 80 and 81 make contact with contacts 87 and 88 respectively. The other cam elements in each odometer component corresponding to cam 63 actuate similar double-pole, double-throw switches.

Fig. 10 shows another embodiment of a double-pole, double-throw switch mechanism which may be employed instead of the one illustrated in Fig. 9. It consists of a cylindrical member 90 having a peripheral insulator strip 91 insulating the two conductive portions 101, 102 of the circumferential surface thereof. Insulator strip 91 is divided into a plurality of sections: 91a, 91b, 91c, 91d on the visible surface of the cylinder and four other similar sections on the hidden surface. Each section of the insulator strip encompasses an angle of 45° with respect to the center of the cylinder. Cylinder 90 replaces cam member 63 in each of the odometer components.

Each cylinder is provided with six brushes 95–100 respectively. Brushes 95 and 100 correspond to the switch arms and the other brushes to the switch contacts. In the position shown, brush 95 engages brush 98 and brush 100 engages brush 97. Assuming that the cylinder illustrated corresponds to switch 20 (Fig. 2), it is apparent that brushes 98 and 97 correspond to the "0" contacts of said switch. When cylinder 90 rotates 45°, brush 96, which is presently engaged with insulator strip 91a will move to conductor portion 101 and brush 97 will move to insulator strip portion 91b. Similarly, brush 99 will move to a conductive portion (not shown) and brush 98 to an insulator section (not shown). At this later time, brush 95 will be in contact with brush 96 and brush 100 will be in contact with brush 99. Therefore brushes 96 and 99 correspond to the "1" contacts of switch 20.

The table of Fig. 11 shows the first sixteen combinations of switch positions representing the binary numbers corresponding of 0–15. The remaining sixteen combinations are the same as the ones shown except that switch 30 is in the "1" rather than the "0" position.

In the embodiment of the invention illustrated, a source of alternating current power is used to energize an alternating current, reversible, condenser-run induction motor. It should be understood, however, that other types of mechanical driving systems may be employed for the same purpose. Figure 12 illustrates one such system which includes a source of direct current power 120, one output lead 52 of which is connected to the armature 125 of a reversible direct current motor. The other output lead of the direct current power source is connected to the local and remote banks of switches 121 (analogous to switch banks 13 and 16, Figs. 1 and 2). The output leads 50 and 51 of the switch banks are connected to separate field windings 124 and 123 respectively of motor 122.

Rather than leading to the field windings of an alternating current or direct current motor, leads 50, 51 and 52 may instead be connected to energize two separate coils of a three-position alternating current or direct current relay with operates direct current or alternating current single or poly-phase motor or motors. In such case, the circuit may be arranged so that a pair of center contacts of the three-position relay are connected to an electromagnetic brake for locking the driving motor when the driving and driven shafts are in positional alignment.

There has been described an improved binary code remote positioning servomechanism which is particularly adapted to very precise positioning of an output shaft to any one of a large number of discrete positions in response to the positioning of a driving shaft. No relays, electron tubes, tachometers or other complex elements are required. At the receiving end of the system, a transmitted binary number indicative of the position of the driving shaft is compared with a binary number indicative of the position of the driven shaft, digit by digit from the largest to the smallest digit. The result of this comparison is one of three things, either one shaft is ahead of the other, behind the other, or both shafts are in the same position. As a result of this information a drive mechanism either does not run if the shafts are in the same position, or automatically runs in one direction or the other until the two shafts are in the same position.

What is claimed is:

1. A system for moving one object into a given relative position with respect to another object comprising, in combination, translating means for translating the position of an object into a first binary number indicative of its position; translating means for translating the position of a second object into a second binary number which is equal to said first binary number when said second object is in said given relative position and which is greater than said first binary number when one of said objects departs from its relative position with respect to the other of said objects in one sense and less than said first binary number when said one object departs from its relative position with respect to said other object in another sense; comparison means for comparing said first and second binary numbers and deriving therefrom, when said numbers are different, an output voltage of predetermined amplitude having a sense dependent on the sense of said difference; and means responsive to said output voltage for moving one of said objects with respect to the other in the correct sense to reduce to zero said difference.

2. A system for moving one object into the same relative position as another object comprising, in combination, translating means for translating the position of an object into a first binary number indicative of its position; translating means for translating the position of another object into a second binary number which is equal to said first binary number when said two objects are in the same relative positions and which is greater than said first binary number when one of said objects departs from its same relative position with respect to the other of said objects in one sense and less than said first binary number when said one object departs from its same relative position with respect to said other object in another sense; comparison means for comparing said first and second binary numbers on the binary level and deriving therefrom, when said numbers are different, an output voltage of predetermined amplitude having a sense dependent on the sense of said difference; and means responsive to said output voltage for moving one of said objects in the correct sense to reduce to zero said difference.

3. A system for moving two objects into positional correspondence comprising, in combination, translating means including a plurality of double-pole, double-throw switches for translating the position of one of said objects into a first binary number indicative of said position; translating means including a plurality of double-pole, double-throw switches for translating the position of the other of said objects into a second binary number which is equal to said first binary number when said objects are in positional correspondence and which is greater than said first binary number when one of said objects departs from said positional correspondence in one sense and less than said first binary number when said one object departs from said positional correspondence in another sense; comparison means for comparing said first and second binary numbers and deriving therefrom, when said numbers are different, an output of constant magnitude having a sense dependent on the sense of said difference; and means responsive to said output for moving one of said objects in the correct sense to reduce to zero said difference.

4. A system for moving two objects into positional correspondence comprising, in combination, translating means for translating the position of one of said objects into a first binary number indicative of said position; translating means for translating the position of the other of said objects into a second binary number which is equal to said first binary number when said objects are in positional correspondence and which is greater than said first binary number when one of said objects departs from said positional correspondence in one sense and less than said first binary number when said one object departs from said positional correspondence in another sense; comparison means for comparing said first and second binary numbers on the binary level, digit by digit, in decreasing order of magnitude of said digits, and deriving therefrom, when said numbers are different, an output having a sense dependent on the sense of said difference; and means responsive to said output for moving one of said objects in the correct sense to reduce to zero said difference.

5. A system for moving a driven object into positional correspondence with a driving object comprising, in combination, translating means coupled to said driving object for translating the position thereof into a first binary number indicative of said position; translating means coupled to said driven object for translating the position thereof into a second binary number which is equal to said first binary number when said two objects are in positional correspondence and which is greater than said first binary number when one of said objects departs from said positional correspondence in one sense and less than said first binary number when said one object departs from said positional correspondence in another sense; comparison means including said translating means for comparing said first and second binary numbers on the binary level, digit by digit, in decreasing order of magnitude of said digits, and deriving therefrom, when said numbers are different, an output voltage of predetermined amplitude having a sense dependent on the sense of said difference; and driving means responsive to said output voltage for moving said driven object in the correct sense to reduce to zero said difference.

6. A system as set forth in claim 5, said objects comprising rotatable shafts.

7. A system as set forth in claim 5, said two translating means comprising separate sets of double-pole, double-throw switches.

8. A system for moving a driven object into positional correspondence with a driving object comprising, in combination, translating means including a first bank of double-pole, double-throw switches mechanically coupled to said driving object for translating the position thereof into a first binary number indicative of said position; translating means including a second bank of double-pole, double-throw switches mechanically coupled to said driven object for translating the position thereof into a second binary number which is equal to said first binary number when said two objects are in positional correspondence and which is greater than said first binary number when said driven object departs from said positional correspondence in one sense and less than said first binary number when said driven object departs from said positional correspondence in another sense, the number of switches in said second bank of switches being equal to the number of switches in said first bank of switches; connections for a source of power; a reversible motor, said connections for said source of power, said first bank of switches, said second bank of switches and said motor being effectively connected in series, said motor being mechanically coupled to said driven shaft for driving the same; and switch interconnection means for disconnecting said source of power from said motor when said two banks of switches represent the same binary number, and supplying power through said switches to said motor, when said second bank of switches represent a binary number different than the binary number represented by said first bank of switches, in the correct sense to reduce said difference to zero and thereby to move said driven objects into positional correspondence with said driving object.

9. A system for moving one object into the same relative position as another object comprising means for deriving from the first of said objects a binary number indicative of the position of said object; means for deriving from the second of said objects a binary number indicative of the position of said second object which is equal to said first binary number when said second object is in the same relative position as said first object and which is greater than said first binary number when one of said objects departs from its relative position with respect to the other of said objects in one sense and less than said first binary number when said one object departs from its relative position with respect to said other object in another sense; means for comparing the digit of largest value of said first and second binary numbers and deriving therefrom, solely when said digits are different, an output having a sense dependent upon the sense of said difference; means for applying said output, if one is present, to one of said objects to move it in the correct sense with respect to the other of said objects to reduce the difference between said first and second binary numbers; means for comparing the digit of second largest value of said two binary numbers, after the digits of largest value of said binary numbers are equal, and deriving therefrom, solely when said digits of second largest value are different, an output having a sense dependent on the sense of said difference; means for applying said last-named output, when one is present, to said one object for moving it in the correct sense with respect to the other of said objects further to reduce said difference between said two binary numbers; and means for repeating the comparison of digits, as above set forth, for the remaining digits of said two binary numbers, in decreasing order of magnitude of said digits, until said difference between said two binary numbers is reduced to zero.

10. A discrete-position servo system for moving a first object into a given relative position with respect to a second object comprising, in combination, a first plurality of switches mechanically coupled to said first object for translating its position into a first binary number; a second plurality of switches mechanically coupled to said second object for translating the position of said second object into a second binary number which is equal to said first binary number when said first object is in said given relative position, and which is greater than said first binary number when one of said objects departs from its given relative position with respect to the other object in one sense, and less than said first binary number when said one object departs from its given relative position with respect with the said other object in another sense; a source of power; reversible driving means coupled to said first object for driving the same in one direction when said power is applied thereto in one sense and in an opposite direction when said power is applied thereto in an opposite sense; and means for connecting said first plurality of switches, said second plurality of switches, said driving means, and said source in such manner that when said second binary number is different than said first binary number in one sense, power is applied from said source through at least some of said switches to said driving means in one sense to reduce said difference, and when said second binary number is different the said first binary number in an opposite sense, power is applied from said source through at least some of said switches in an opposite sense to reduce said difference, and when said binary numbers are equal, said switches disconnect said source from said driving means.

11. A discrete-position servo system as set forth in claim 10, wherein said source is a direct current source and said driving means is a direct current motor.

12. A discrete-position servo system as set forth in claim 10, wherein said source comprises an alternating current source and said motor comprises a reversible, alternating current motor.

13. A discrete-position servo system as set forth in claim 10, wherein each translating means comprises an odometer type mechanical movement for selectively opening and closing the plurality of switches to which it is coupled.

14. A discrete-position servo system as set forth in claim 10, wherein said switches comprises double-pole, double-throw switches.

References Cited in the file of this patent

UNITED STATES PATENTS

| | | |
|---|---|---|
| 2,455,137 | Pennington | Nov. 30, 1948 |
| 2,476,673 | May et al. | July 19, 1949 |
| 2,592,088 | Wannamaker et al. | Apr. 8, 1952 |
| 2,630,552 | Johnson | Mar. 3, 1953 |
| 2,685,054 | Brenner et al. | July 27, 1954 |
| 2,686,235 | Leathers | Aug. 10, 1954 |